UNITED STATES PATENT OFFICE.

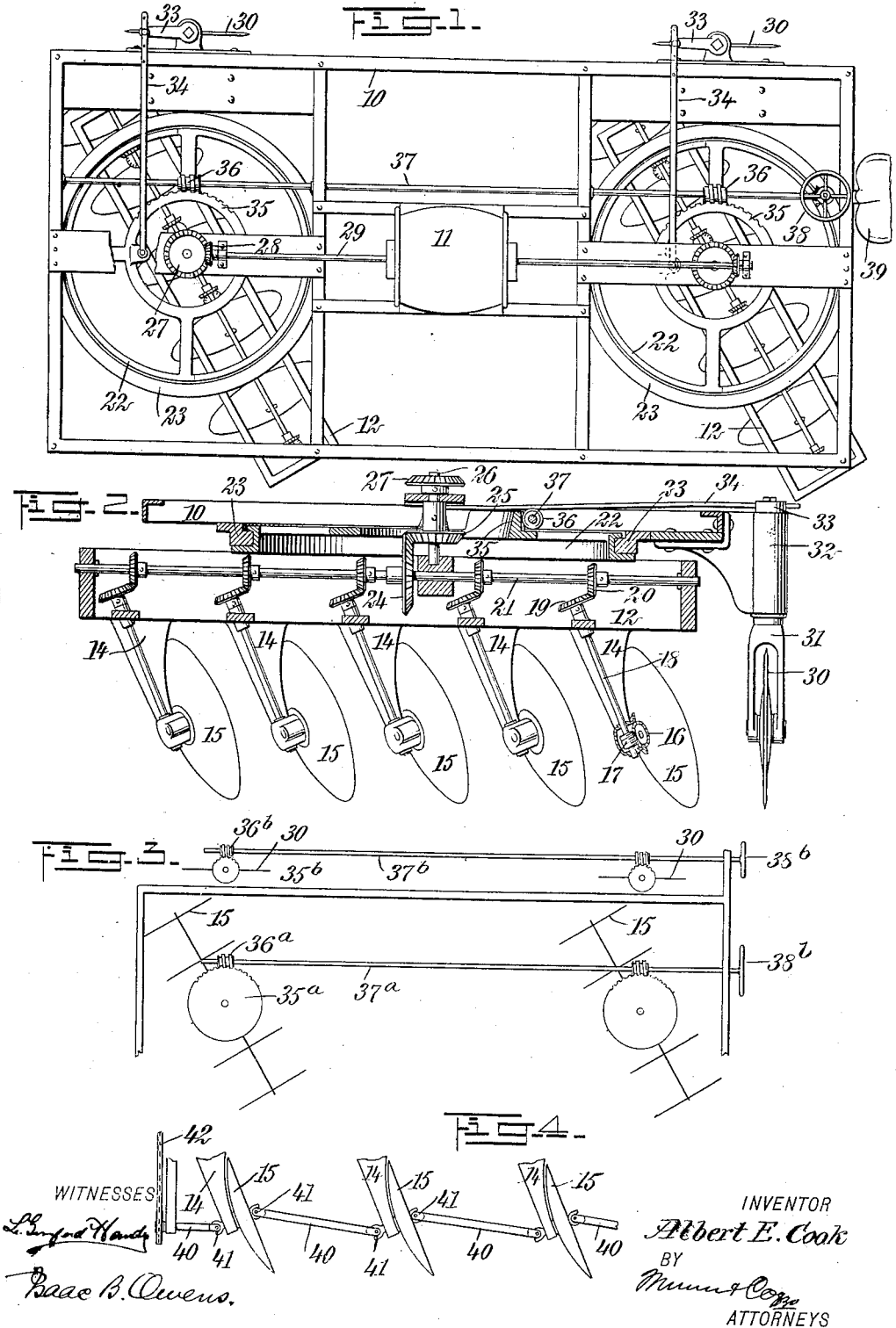

ALBERT E. COOK, OF ODEBOLT, IOWA, ASSIGNOR TO THE INTERNATIONAL MOTOR PLOW COMPANY, OF CHICAGO, ILLINOIS, A CORPORATION OF SOUTH DAKOTA.

MOTOR-PLOW.

No. 918,128.      Specification of Letters Patent.      Patented April 13, 1909.

Application filed May 25, 1906, Serial No. 318,665. Renewed September 19, 1908. Serial No. 453,825.

*To all whom it may concern:*

Be it known that I, ALBERT E. COOK, a citizen of the United States, and a resident of Odebolt, in the county of Sac and State of Iowa, have invented a new and Improved Motor-Plow, of which the following is a full, clear, and exact description.

My present invention relates to improvements in motor driven plows of the type disclosed in the prior patent to S. E. Kurtz, Number 781,214, dated January 31, 1905, one-half of which was assigned to me, and the patent to Cook and Kurtz, Number 789,528, May 9, 1905, such type of plows being characterized by one or more combined cultivating and propelling tools, preferably disks, which are connected with the frame and with a driving engine mounted on the frame, so that the operation of said tools or disks both cultivates the ground and propels the apparatus over the same, and by adjustment of the inclination of the axis or axes of the tool or tools the course of the apparatus over the ground may be directed and changed at will.

In the two prior patents mentioned above, we have disclosed two or more pairs of gangs of cultivating and propelling tools, the gangs of each pair being arranged to cross the line of movement of the plow oppositely to each other so that the disks or other tools act effectively on the earth to cultivate it, and their opposite exerted side thrusts result in a propelling effort directly ahead. In these forms of our invention one tool or gang of tools works against the other, the result being propulsion ahead.

My present invention relates, however, to a form of the invention in which the side thrust or tendency of one tool or gang of tools is resisted not by an opposing tool or gang of tools, but by a means or device which operates somewhat on the principle of the land side of a common plow, that is to say, by engaging the earth and thus resisting lateral displacement of the plow without affecting, however, free forward propulsion thereof. In the preferred form of my present invention this novel device for resisting lateral movement is in the form of one or more disks which enter the earth and are adjustable to facilitate steering the plow. It may, however, assume various other forms, such, for example, as that of a continuous runner or plate which enters the earth to prevent lateral motion after the manner of a keel of a marine vessel.

My present invention also relates to certain improvements in the manner of disposing the propelling and cultivating disks, which is to say by arranging them not only so that their axes cross the line of travel of the plow but also by disposing the disks at an inclination to the surface of the ground, this resulting in a more pronounced pulverization of the earth. In adapting this improvement the disks thus inclined may be driven from separate trains of gears running respectively to each disk, or by a universally jointed shaft, or any other device suitable for the purpose.

The invention involves various other features of major or minor importance, and all will be fully set forth hereinafter and particularly pointed out in the claims.

Reference is to be had to the accompanying drawings which illustrate as examples several manners in which my present invention may be practically embodied and in which drawings—

Figure 1 is a plan view with parts broken away; Fig. 2 is a transverse section taken through one of the gangs of disks; Fig. 3 is a diagrammatic plan view illustrating a modification in the means for adjusting the inclination of the propelling and cultivating tools and the land side device; and Fig. 4 is a diagrammatic view illustrating a modification in the means for driving the inclined propelling and cultivating disks.

Referring first to Figs. 1 and 2, 10 indicates a frame carrying an engine or other source of motive power 11, both of which may be of any desired form and construction. This frame 10 carries two tool frames 12 which mount by brackets 14 combined cultivating and propelling tools 15. These tools 15 are preferably rotary disks such as are well known in the art, and as are fully disclosed in the prior patents to Kurtz, and Cook and Kurtz above referred to, said disks being held by said brackets at an inclination to the surface of the earth, and revolubly mounted so that they may be driven as shown in Fig. 2 through trains of gearing composed of the following elements, to wit,—a worm wheel 16, fastened to the disk, a worm 17 fastened to the shaft 18 mounted in the corresponding bracket 14 and connected by miter gears 19 and 20 to a driving shaft 21 which is rotatably held in the tool frame 12. Each tool frame is provided with a fifth wheel ring or runner 22, and these are engaged with corresponding segments 23 fastened to or suitably mounted on the main frame 10. The shafts 21 are connected by miter gears 24 and 25 respectively with shafts 26 which are suitably mounted coincident to the center of pivotal movement of the tool frames, and are in turn connected by gears 27 and 28 with the shaft 29 of the engine 11, so that positive rotary movement is imparted from said engine through the various transmission devices to the cultivating and propelling tools or disks 15. It will thus appear that the tool frames 12 carrying the tools or disks 15 are arranged so that said disks engage the earth at an inclination to the surface thereof, and so that the tool frames may be freely adjusted around vertical centers to cause the axes of the tools 15 to extend at true right angles to the line of movement of the apparatus, or at any inclination thereto that may be desired. In the first position rotation of the cultivator tools will cause them to act simply as traction or propelling wheels, advancing the apparatus over the ground without plowing the same, while when the parts assume the second position rotation of the tools 15 from the motor or engine will cause said tools not only to propel the apparatus over the earth but to effectually plow, harrow or otherwise cultivate the ground.

As here shown, the land side device is composed of two disks 30 which are arranged at one side of the frame 10 and are suitably mounted on forks 31, the stems of which turn freely in vertical bearings 32 attached to the frame 10. These land-side disks 30 are intended to operate normally lying in a plane parallel to the line of movement of the apparatus, and they are designed to enter below the surface of the earth so as effectually to engage the same and enable them to resist lateral displacement of the plow in either direction. Said disks are mounted so that they may be turned around vertical centers to facilitate steering and otherwise manipulating the plow, and as shown in Fig. 1 the parts are so arranged that the land-side disks 30 are adjusted around vertical centers simultaneously with and corresponding to the adjustment of the tool frames 12. This is effected by connecting to the stems of the forks 31 arms 33, said arms being adjustably connected as shown in Fig. 1 with links 34, and these links are in turn articulated to a part of the fifth wheel sections 22 or to some other part in secure connection with the tool frames 12. Said fifth wheel sections 22 also carry in rigid connection therewith toothed rings 35, and with the toothed rings 35 worms 36 are meshed. The worms 36 are secured to a shaft 37 which is rotatable in the frame 10, and connected with any suitable gear 38 by which the shaft may be manually rotated, said gear 38 being located adjacent to a seat 39 mounted on the frame 10. It, therefore, follows that the tool frames 12 may be by means of this gearing freely adjusted around the centers of vertical movement of said frames to adjust the inclination of the gang of tools to the line of movement of the plow, and that this adjustment of the tools results in a simultaneous and corresponding adjustment of the land-side disks 30 so as to facilitate steering and turning the plow. It will also be observed that by providing an adjustable connection between the links 34 and arms 33 I am enabled to adjust at will the relative inclination of the tool frames to the line of movement, thus enabling me readily to suit the apparatus to the various sorts of soil or to various other agricultural conditions.

If desired the inclinations of the cultivating and propelling tools and the land-side devices may be adjusted independently of each other, and not in unison, as in Fig. 1. To accomplish this change I provide the arrangement shown diagrammatically in Fig. 3, in which two shafts $37^a$ and $37^b$ are provided, these being provided with hand wheels $38^a$ and $38^b$, or any suitable means for manually or otherwise rotating the shafts. Said shafts carry worms $36^a$ and $36^b$ in mesh with toothed members $35^a$ and $35^b$ respectively in connection with the gang or gangs of cultivating tools and the land-side disks, thus enabling the inclinations of the tools to be changed at will independently of the adjustment in the inclination of the land-side disks.

In Fig. 2 I have illustrated a separate train or gearing for driving each cultivating disk. If desired, however, the universally jointed shaft arrangement shown in Fig. 4 may be provided. In this form of the invention the inclined cultivating and propelling disks 15 have their inclined axes joined by shaft sections 40 through the medium of universal joints or couplings 41, and this composite shaft is driven by a single gear 42 which may be of any desired form. As here shown it is a sprocket chain and wheel arrangement connected with one end of the shaft. This device it will be seen avoids the use of a separate train of gears for each inclined disk.

Having thus described the preferred embodiment of my invention what I claim as new, and desire to secure by Letters Patent is:

1. A motor-plow having a frame, a plowing tool joined thereto and serving, when in normal operation, to exert a propelling influence along a line at an inclination to the normal line of movement of the plow, an engine mounted on the frame and connected with the said tool positively to drive the same, a land side device connected to the frame and serving when in normal operation, to engage the ground in a plane substantially parallel to said normal line of movement of the plow, to resist the lateral propelling action of said tool and to cause the plow to advance on its said normal line of movement and a mechanism connected to said plowing tool and land side device, for changing the positions of the same with respect to the line of movement of the plow whereby to steer the plow.

2. A motor-plow having a frame, a rotary plowing disk connected thereto and disposed, when in normal position with its axis diagonal to the line of movement of the plow, thereby exerting a propelling influence along a line at an inclination to the said line of movement of the plow, an engine mounted on the frame and connected with said plowing disk positively to rotate the same, and a rotary disk landside connected to the frame, and adapted, when in normal operation, to engage the ground in a plane substantially parallel to the said normal line of movement of the plow, to resist the lateral propelling action of said plowing disk and cause the plow to advance along its normal line of movement, and a mechanism in connection with said land side disk and rotary plowing disk by which mechanism to change the positions thereof with respect to the line of movement of the plow to steer the plow.

3. In a motor plow, the combination of a main frame, a motor mounted thereon, a tool-frame, means for mounting the tool-frame to turn with respect to the main frame around a vertical axis, a shaft mounted on the tool-frame, gearing connecting the shaft with the motor and comprising an element coincident to the center of turning movement of the tool-frame, a plurality of rotary cultivating disks, means for mounting them on the tool-frame, means for independently driving them from the shaft for the purpose specified and a land side device attached to the main frame and coacting with the cultivator disks to prevent sidewise movement of the plow.

4. In a motor plow, the combination of a main frame, a motor mounted thereon, a tool-frame, means for mounting the tool-frame to turn with respect to the main frame around a vertical axis, a shaft mounted on the tool-frame, gearing connecting the shaft with the motor and comprising an element coincident to the center of turning movement of the tool-frame, a plurality of rotary cultivating disks, means for mounting them on the tool-frame, means for independently driving them from the shaft for the purpose specified and a land side device attached to the main frame and coacting with the cultivator disks to prevent sidewise movement of the plow, the said means for mounting the disks maintaining them with their axes inclined to the ground and the means for driving the disks comprising oblique shafts geared respectively with the disks and with the shaft on the tool frame.

In testimony whereof I have signed my name to this specification in the presence of two subscribing witnesses.

ALBERT E. COOK.

Witnesses:
  Isaac B. Owens,
  Thomas F. O'Brien.